(12) United States Patent
Butinya et al.

(10) Patent No.: US 11,104,147 B2
(45) Date of Patent: Aug. 31, 2021

(54) FLOW CHANNEL PRESSURE MEASUREMENT

(71) Applicant: HEWLETT-PACKARD DEVELOPMENT COMPANY, L.P., Spring, TX (US)

(72) Inventors: David Butinya, Sant Cugat del Valles (ES); Marta Coma Vives, Sant Cugat del Valles (ES); Albert Crespi Serrano, Sant Cugat del Valles (ES); Joan-Albert Miravet Jimenez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/470,940

(22) PCT Filed: Apr. 19, 2017

(86) PCT No.: PCT/US2017/028313
§ 371 (c)(1),
(2) Date: Jun. 18, 2019

(87) PCT Pub. No.: WO2018/194579
PCT Pub. Date: Oct. 25, 2018

(65) Prior Publication Data
US 2019/0337294 A1    Nov. 7, 2019

(51) Int. Cl.
*B41J 2/175*    (2006.01)
*G01L 7/08*    (2006.01)
(Continued)

(52) U.S. Cl.
CPC ............. *B41J 2/17566* (2013.01); *B41J 2/18* (2013.01); *G01L 7/08* (2013.01); *G01L 9/0042* (2013.01); *G01L 19/0023* (2013.01)

(58) Field of Classification Search
CPC ........................................................ B41J 2/18
See application file for complete search history.

(56) References Cited

U.S. PATENT DOCUMENTS

| 4,639,738 A | 1/1987 | Young et al. |
| 6,398,329 B1 | 6/2002 | Boyd et al. |
| (Continued) | | |

FOREIGN PATENT DOCUMENTS

JP    4077264 B2    4/2008

OTHER PUBLICATIONS

HPDC, "International Search Report and Written Opinion," dated Mar. 6, 2018, International App. No. PCT/US2017/028313 7 p.

*Primary Examiner* — Julian D Huffman
(74) *Attorney, Agent, or Firm* — HP Inc. Patent Department

(57) ABSTRACT

A differential pressure sensor is used for measuring or identifying a pressure difference, for example to determine a movement or speed of fluid in a fluid conduit or printer re-circulation conduit. The differential pressure sensor determines the difference between an air pressure and a fluid pressure, wherein the fluid is moving in a flow channel. The flow channel includes a surface conveying a fluid between a first port and second port. An opening in the surface of the flow channel provides a fluid communication between the differential pressure sensor and fluid. Moreover, the sensor is arranged in air communication with the pressure box, such as to allow the differential pressure sensor to identify the pressure difference between the air pressure in the pressure box and the fluid pressure in the flow channel.

15 Claims, 4 Drawing Sheets

(51) Int. Cl.
*G01L 9/00* (2006.01)
*G01L 19/00* (2006.01)
*B41J 2/18* (2006.01)

(56) References Cited

U.S. PATENT DOCUMENTS

| | | |
|---|---|---|
| 6,467,861 B1 | 10/2002 | Thielman et al. |
| 7,004,557 B2 | 2/2006 | Inoue |
| 8,356,867 B2* | 1/2013 | Lee .................. B41J 2/175 |
| | | 347/6 |
| 8,591,012 B2 | 11/2013 | Yoshino et al. |
| 8,814,294 B2 | 8/2014 | Shibata |
| 2002/0059833 A1 | 5/2002 | Imai |
| 2009/0237426 A1 | 9/2009 | Kimura |
| 2015/0314058 A1* | 11/2015 | O'Mahony ......... G01L 19/0046 |
| | | 417/63 |
| 2017/0008297 A1 | 1/2017 | Angulo Navarro et al. |

* cited by examiner

FLOW CHANNEL PRESSURE MEASUREMENT

The liquid pressure of a fluid in a flow channel can be measured using sensor arrangements and can provide useful information to determine the operating state of a fluid conduit system. For example, a printer can have fluid conduits coupled to printheads and the operating state of the printer may depend on a certain fluid flow in the conduits.

Depending on the application, the fluid pressure of different types of fluids can be measured. For example, the fluid can include heavy pigments or particles that tend to precipitate if the fluid is not moving, or the fluid can tend to carry air or gas molecules. Moreover, a fluid can be conveyed in the fluid conduit system under different pressure and speed conditions.

BRIEF DESCRIPTION OF DRAWINGS

Certain examples are described in the following detailed description and in reference to the drawings, in which.

DETAILED DESCRIPTION

Pressure sensors can be used for measuring the fluid pressure of a stationary fluid, or of a fluid moving in a flow channel. Fluid pressure measurements can provide useful information to determine the operating state of a system or apparatus, for example to determine the fluid pressure of a fluid moving in a flow channel, or to determine or estimate the fluid level in a supply tank.

A pressure sensor can be coupled to a flow channel forming a part of the fluid conduit system and may be in fluid communication with the liquid such as to measure the fluid pressure. For example, pressure sensors can have a single port coupled to a bifurcation of the flow channel to measure a stationary fluid pressure indicative of the fluid pressure of the moving fluid. In other words, the fluid is branched off from the flow channel and collected in a dead-end conduit body leading to the single-port pressure sensor. Hence, the pressure sensor is in fluid communication to a stationary fluid that is not moving in the dead-end conduit body.

If the fluid includes particles, such as for example ink with heavy pigments, the stationary fluid may tend to precipitate in the dead-end conduit body, for example close to the pressure sensor impairing the sensor measurement accuracy. Moreover, the dead-end conduit body can also trap air or gases between the pressure sensor and fluid. As a result, the compressed air or gases can influence the measurement precision, for example by inducing an oscillation frequency corresponding to compression and expansion patterns of the air or gas volumes. Purging the air out of a system having a bifurcation may help to obtain acceptable measurement results.

A printer can have ink conduits coupled to printheads. The fluid pressure in the conduits may be measured to monitor or determine the operating state of the printer. Monitoring can be used in a printer including an ink recirculation system for dispersing heavy ink pigments prior to printing. If the ink conveyed in the ink conduits has heavy particles or pigments, the ink may tend to precipitate or clog the dead-end conduit body leading to the pressure sensor. Bifurcation based sensor arrangements further can influence measurement precision due to air or other gases being trapped in the dead-end conduit body.

Figure 1:
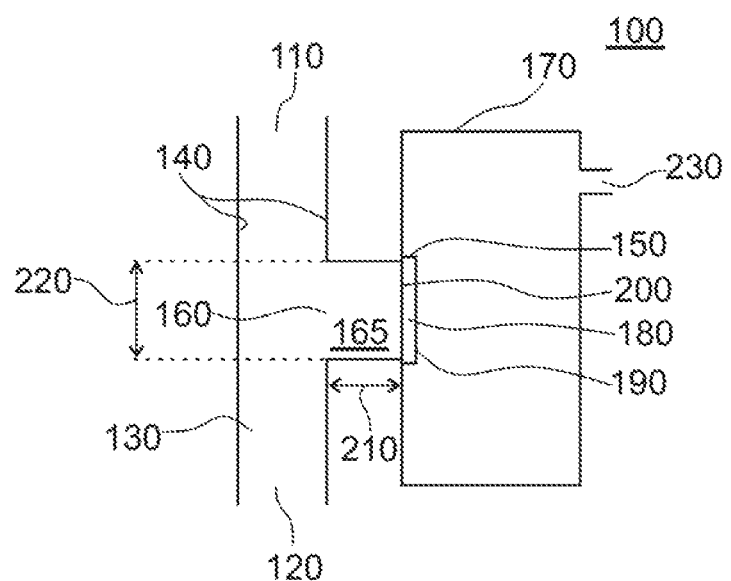
FIG. 1 shows an example of a sensor device comprising two ports and a differential sensor.

FIG. 1 shows an example of a sensor device 100 comprising a first port 110 and a second port 120, wherein the first port 110 and the second port 120 are coupled by a flow channel 130. The flow channel 130 has a surface 140 for conveying a fluid between the first port 110 and the second port 120, or from the second port 120 to the first port 110. In other words, the fluid subject to fluid pressure measurement is flowing in the flow channel 130 between two ports of the device, an inlet and an outlet.

The surface 140 of the flow channel 130 has an opening 160 allowing the fluid to make contact with a sensor 150. Thus, the sensor 150 is arranged in fluid communication with an opening 160 in the surface 140 of the flow channel 130. In FIG. 1, the opening 140 in the surface 160 is connected to the sensor 130 via a fluid chamber 165, wherein the opening 140 forms one end of the fluid chamber 165 and the sensor 150 forms the other end of the fluid chamber 165. In an example, the sensor 150 is arranged to seal the fluid chamber 165 such as to prevent any fluid leakage, for example by arranging a sealing element between the fluid chamber 165 and the sensor 150, for example a rubber ring or an adhesive sealing material.

As shown in FIG. 1, a pressure box 170 is arranged at the opposite side of the sensor 150. The pressure box 170 contains air and is arranged in air communication with the sensor 150. In an example, the pressure box 170 is hermetically sealed against the sensor 150 such that the air pressure in the pressure box 170 can be exposed to the sensor 150 without leakage effect.

In this way, the sensor 150 can represent a differential pressure sensor to identify the pressure difference between the air pressure in the pressure box 170 and the fluid pressure in the flow channel 130. For example, the differential pressure sensor can be operated to measure the difference between the air pressure in the pressure box 170 and the fluid pressure in the flow channel 130 in the range −6 psi to 6 psi.

The fluid chamber 165 separates the differential pressure sensor 150 from the moving fluid of the flow channel 130. In an example, the fluid chamber 165 is disposed directly between the differential pressure sensor 150 and the flow channel 130, with no further intervening components. Thus, the sensor device 100 can measure the fluid pressure of a fluid that is moving between two ports of the sensor device 100 via a flow channel 130, wherein an opening 160 in the flow channel 130 allows the sensor 150 to be in a very compact fluid connection with the moving fluid. Accordingly, most, if not all, of the fluid contained by the sensor device 100 is moving, reducing the risk of heavy particles or pigments carried by the fluid precipitating in the sensor and impairing the sensor functionality, and also reducing the risk that air or gases are being trapped between the pressure sensor and fluid.

For example, the fluid conveyed between the first port 110 and the second port 120 can represent an ink including pigments or heavy particles, such as for example: white ink, metallic ink, or silver ink. In an example, the white ink includes titanium dioxide in its pigments, which can tend to precipitate when the ink is not moving, and thus can cause the settling of pigments or particles that deteriorate the performance of the sensor device 100.

In an example, the sensor 150 of the sensor device 100 includes a diaphragm 180 having an air side 190 exposed to the air pressure in the pressure box 170 and a fluid side 200 exposed to the fluid pressure in the flow channel 130. For example, the diaphragm 180 can be made of a rigid material, such as for example ceramic, metal or plastic, and can be formed as a part of a semiconductor device. Accordingly, a deflection due to bending of the diaphragm 180 can be determined to identify the pressure difference between the air pressure in the pressure box 170 and the fluid pressure in the flow channel 130, for example by using an electronic sensor arrangement for determining a mechanical deviation caused by the deflection.

In the example shown in FIG. 1, the distance 210 between the diaphragm 180 and the surface 140 of the flow channel 130 can be reduced to further minimize the volume of the fluid chamber 165 separating the sensor 150 from the flow channel 130. In this way, the possibility of precipitation or collection of air or gases in the sensor device 100 is further reduced. In an example, the distance 210 between the diaphragm 180 and the surface 140 of the flow channel 130 is in the range 0 to 2 mm. In a further example, the volume between the surface 140 of the flow channel 130 and the diaphragm 180 is in the range 0.004 to 0.012 $cm^3$, or approximately 0.008 $cm^3$.

In an example, the sensor device 100 is positioned and oriented such that the diaphragm 180 is arranged above the flow channel 130 such that any precipitation in the fluid chamber 165 is pulled by gravitation towards the flow channel 130, further improving the sensor device 100 performance.

The diameter 220 of the diaphragm 180 exposed to the fluid pressure influences the volume of the fluid chamber 165 separating the sensor 150 from the flow channel 130, and thus can influence the risk of precipitation or collection of air or gases in the sensor device 100. In an example, a small diameter 220 of the diaphragm 180 exposed to the fluid pressure is selected to minimize the respective volume, for example, a diameter 220 in the range 2 to 10 mm.

In an example, the opening 160 in the surface 140 of the flow channel 130 is circular or rectangular, or has any other shape allowing an efficient recirculation of fluid collected in the volume of the fluid chamber 165 separating the sensor 150 from the flow channel 130. In this way, the possibility of precipitation or collection or air or gases in the sensor device 100 is reduced.

Figure 2:
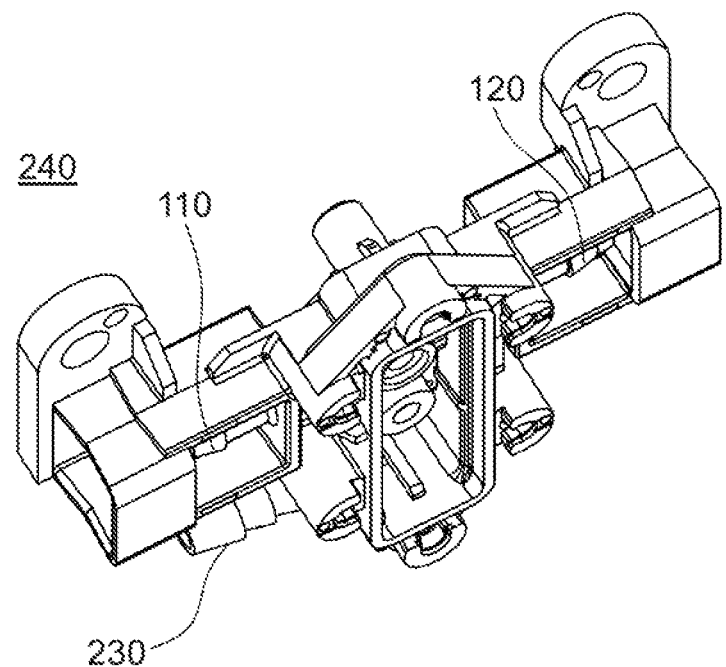
FIG. 2 shows a perspective view of an example of a pressure sensor box forming a part of a sensor device.
Figure 3:
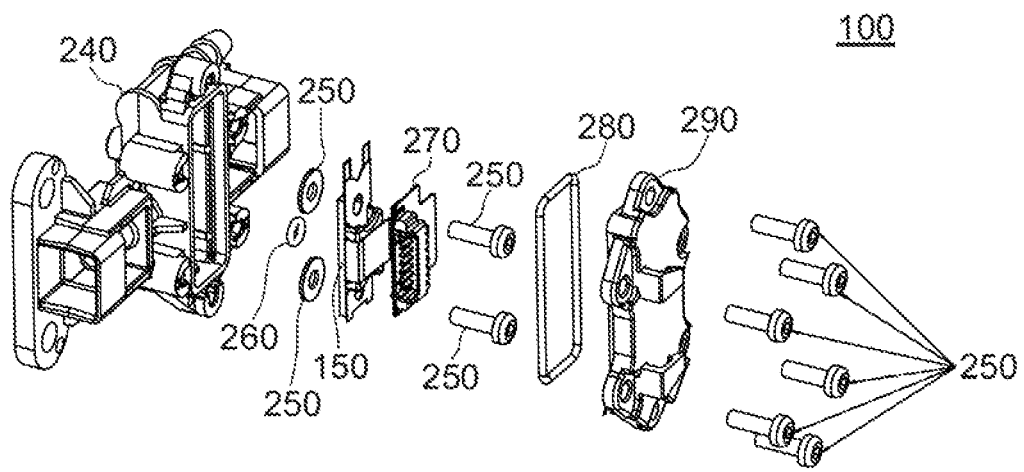
FIG. 3 shows an example of a disassembled sensor device comprising the pressure sensor box shown in FIG. 2.

FIG. 2 shows a perspective view of an example of a pressure sensor box 240 forming a part of a sensor device 100. FIG. 3 shows a corresponding example of the disassembled sensor device 100 comprising the pressure sensor box 240 shown in FIG. 2. As shown in FIGS. 2 and 3, the pressure sensor box 240 comprises a first port 110 and a second port 120, wherein the first port 110 and the second port 120 are coupled by a flow channel for conveying a fluid between the first port 110 and the second port 120, or from the second port 120 to the first port 110. FIG. 3 also shows how the sensor device 100 has the sensor 150 attached to the pressure sensor box 240 by screws and other fixing elements 250. In this example, an O-ring shaped seal 260, for example rubber seal 260, is arrange to attached the fluid side 200 of the sensor 150, exposed to the fluid pressure in the flow channel 130, to the pressure sensor box 240; see also FIG. 1. An electronic sensor arrangement 270 is coupled to the sensor 150 for determining a mechanical movement or deflection of a diaphragm 180 comprised by the sensor 150 to identify the pressure difference between the air pressure in the pressure box 170 and the fluid pressure in the flow channel 130.

In this regard, FIG. 3 shows how a sealing member 280, screws and other fixing elements 250 are used to attach a sensor cover 290 to the pressure sensor box 240. In this way, the sensor cover 290 and pressure sensor box 240 form a pressure box 170 containing air and wherein the pressure box 170 is in air communication with the sensor 150. Hence, the sensor 150 can represent a differential pressure sensor to identify the pressure difference between the air pressure in the pressure box 170 and the fluid pressure in the flow channel 130.

Figure 4:
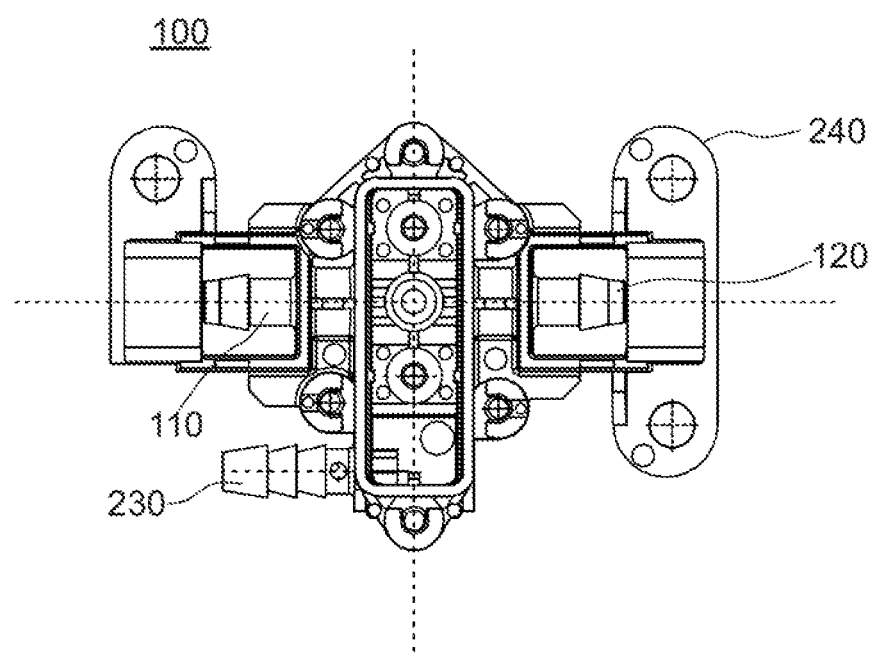
FIG. 4 shows a top view of the example of a sensor device including three ports shown in FIGS. 2 and 3.
Figure 5:
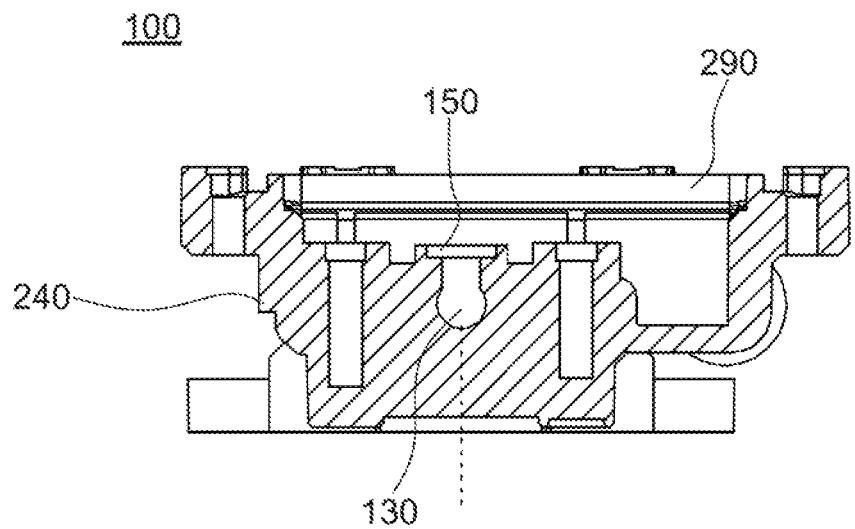
FIG. 5 shows a side view of an example of a sensor device.
Figure 6:
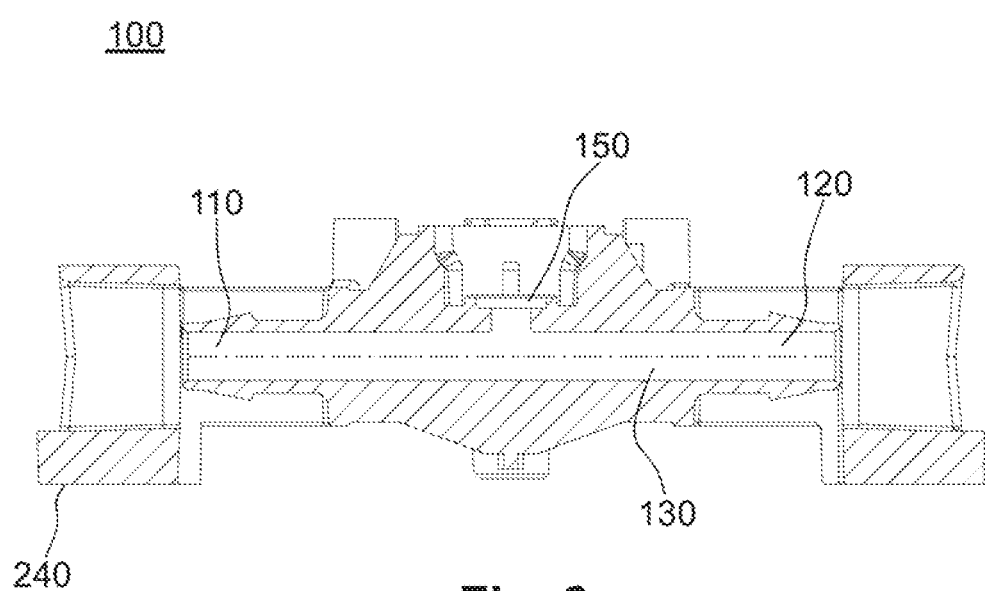
FIG. 6 shows a different side view of the sensor device shown in FIG. 5.

FIGS. 4, 5 and 6 show top and side views of an example of a sensor device 100 including the first and second ports 110, 120 and an additional port 230 of the pressure box 170. The port 230 of the pressure box can, for example, be used to pressurize the air inside the pressure box 170 or to provide an outlet for conveying fluid, for example in case of fluid leakage; see also FIGS. 1 and 2.

The examples of sensor devices 100 shown in FIGS. 1, 2, 4 and 6 have the opening 160 in the surface 140 of the flow channel 130 arranged in the center of the flow channel 130 to further stabilize the fluid flow in the flow channel 130, close to the sensor 150, for measurement accuracy.

In the example of a sensor device 100 shown in FIG. 5 the flow channel 130 is formed to have a circular cross-section, and in a different example, the cross-section may be rectangular, for example with a diameter in the range 2 to 5 mm, for example for flow stability and measurement accuracy.

In the examples of a sensor device 100 shown in FIGS. 1 to 6 the flow channel 130 is a straight channel, for example a flow channel 130 having a length in the range 20 to 40 mm, wherein the surface 140 of the flow channel 130 is even and without protrusions or obstacles. In this way, the surface texture of the flow channel 130 may comprises small or no local deviations from the perfectly flat and straight ideal, improving the flow stability and measurement accuracy.

In an example, the sensor 150 determines the pressure difference between the air pressure in the pressure box 170 and the fluid pressure in the flow channel 130 to determine a movement of the fluid, for example in the range 40 $cm^3$/min to 200 $cm^3$/min. In other words, the measured pressure difference can be used for detecting or determining the movement of fluid, for example when the speed of fluid is in the range 40 $cm^3$/min to 200 $cm^3$/min.

In an example, the sensor device 100 comprises a first port 110 and a second port 120, wherein the first port 110 and the second port 120 are coupled by a flow channel 130. The flow channel 130 has a surface 140 for conveying a fluid between the first port 110 and the second port 120, or from the second port 120 to the first port 110. In other words, the fluid subject to flow pressure measurement is flowing in the flow channel 130 between two ports of the sensor device 100, an inlet and an outlet. The surface 140 of the flow channel 130 has an opening 160 allowing the fluid to make contact with a sensor 150. Thus, the sensor 150 is arranged in fluid communication with an opening 160 in the surface 140 of the flow channel 130. In FIG. 1, the opening 140 in the surface 160 is connected to the sensor 130 via a fluid chamber 165, wherein the opening 140 forms one end of the fluid chamber 165 and the sensor 150 forms the other end of the fluid chamber 165. A pressure box 170 containing air is arranged in air communication with the sensor 150, wherein the sensor 150 includes a diaphragm 180 having an air side 190 exposed to the air pressure in the pressure box 170 and a fluid side 200 exposed to the fluid pressure in the flow channel 130. In this way, the sensor device 100 can identify or measure the pressure difference between the air pressure in the pressure box 170 and the fluid pressure in the flow channel 130, for example to determine a movement or speed of the fluid. In this example, the distance 220 between the diaphragm 180 and the surface 140 of the flow channel 130 is in the range 0 to 2 mm, such that a small volume of the fluid chamber 165 separates the sensor 150 from the flow channel 130, reducing the risk of precipitation or collection of air or gases in the sensor. Moreover, the flow in the flow channel 130 is stabilized by forming the flow channel 130 as a straight channel having a surface 140 guiding the fluid without any protrusions or obstacles.

In this example, the sensor device 100 allows a small amount of the fluid contained by the sensor device 100 not to be moving, and thus reduces the possibility of precipitation in the sensor impairing the sensor functionality, and also reduces the risk that air or gases is trapped between the pressure sensor and fluid. It follows that the sensor device 100 can be used to measure the fluid pressure of ink moving in the flow channel 130, wherein the ink can include pigments or heavy particles. Moreover, the shape and properties of the flow channel 130 are selected to stabilize the flow and to further enhance the pressure measurement precision.

Figure 7:
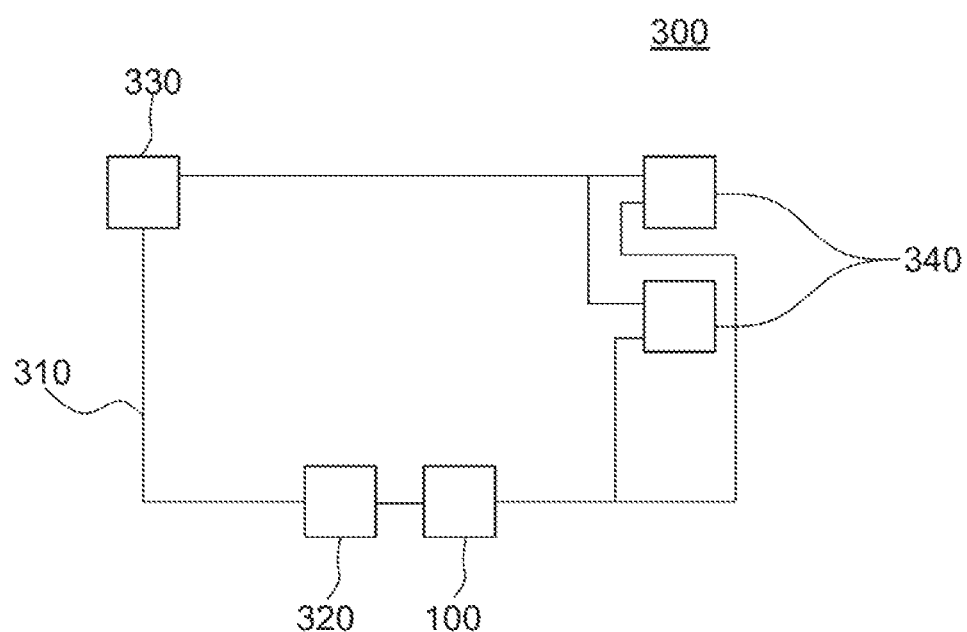
FIG. 7 shows an example of a printer system including a differential pressure sensor arranged in a fluid conduit.

FIG. 7 shows an example of a printer 300 including a differential pressure sensor 100 arranged in a fluid conduit 310.

The printer 300 comprises a fluid conduit 310 and a sensor device 100, wherein the sensor device 100 can determine a movement or speed of fluid in the fluid conduit 310. For example, the movement or speed of fluid in the fluid conduit 310 can be determined to identify a flow of ink in the fluid conduit 310, for example to monitor the operation of the printer, to determine ink consumption or clogging in the fluid conduit 310, or to measure or regulate the flow of ink for other purposes. For example, an ink pump 320 can be controlled based on the determined movement or speed of fluid in the fluid conduit 310, for example to regulate fluid pressure or speed of ink flow in the fluid conduit 310.

In an example, the fluid conduit 310 is a recirculation conduit 310. In other words, the fluid conduit 310 is arranged to circulate a fluid in the printer 300, for example to circulate ink. The ink can, for example, include: white ink, metallic ink, silver ink, or any other type of ink that tends to precipitate or cause the settling of pigments when the ink is not moving, and thus risks clogging the fluid conduit 310. For example, white ink including titanium dioxide in its pigments can represent an ink having heavy pigments or heavy particles.

The ink in the recirculation conduit 310 is circulated such as to keep the ink pigments dispersed. As shown in FIG. 7, the recirculation conduit 310 can couple the ink pump 320 to an ink reservoir 330, the sensor device 100 and printheads 340, wherein the sensor device 100 can determine a movement or speed of fluid in the fluid conduit 310 corresponding to an ink flow in the recirculation conduit 310. Accordingly, in an example, the determined movement or speed of fluid in the fluid conduit 310 can be used for adjusting the pressure provided by the ink pump 320, for example by adjusting the electrical current of the ink pump 320, such that the ink in the recirculation conduit 310 is circulated with a sufficient speed to keep the ink pigments dispersed in the sensor device 100, recirculation conduit 310 and printheads 340.

In the example shown in FIG. 7, the sensor device 100 can comprise: a first port 110 and a second port 120, both in fluid communication with the fluid conduit 310. The sensor device further comprises a flow channel 130 including a surface 140 for conveying a fluid between the first port 110 and the second port 120. Moreover, a sensor 150 included in the sensor device 100 is arranged in fluid communication with an opening 160 in the surface 140 of the flow channel 130; see, for example, FIG. 1.

The sensor device 100 comprises a pressure box 170 arranged in air communication with the sensor 150, wherein the sensor 150 is a differential pressure sensor to identify the pressure difference between the air pressure in the pressure box 170 and the fluid pressure in the flow channel 130. As mentioned above, the determined pressure difference can be used for determining a movement or speed of fluid in the fluid conduit 310, for example in the fluid conduit representing a recirculation conduit 310.

In an example, the printer 300 shown in FIG. 7 can include a sensor device 100 comprising a first port 110 and a second port 120, wherein the first port 110 and the second port 120 are coupled by a flow channel 130. The flow channel 130 has a surface 140 for conveying a fluid between the first port 110 and the second port 120, or from the second port 120 to the first port 110. In other words, the fluid subject to fluid pressure measurement is flowing in the flow channel 130 between two ports of the device, an inlet and an outlet. The surface 140 of the flow channel 130 has an opening 160 allowing the fluid to make contact with a sensor 150. Thus, the sensor 150 is arranged in fluid communication with an opening 160 in the surface 140 of the flow channel 130. In other words, the opening 140 in the surface 160 is connected to the sensor 130 via a fluid chamber 165, wherein the opening 140 forms one end of the fluid chamber 165 and the sensor 150 forms the other end of the fluid chamber 165. A pressure box 170 containing air is arranged in air communication with the sensor 150, wherein the sensor 150 can include a diaphragm 180 having an air side 190 exposed to the air pressure in the pressure box 170 and a fluid side 200 exposed to the fluid pressure in the flow channel 130. In this way, the sensor device 100 can identify or measure the pressure difference between the air pressure in the pressure box 170 and the fluid pressure in the flow channel 130, for example by determining a deflection of the diaphragm 180. In an example, the determined pressure difference is used for identifying the movement or speed of fluid being conveyed in the recirculation conduit shown in FIG. 7. In an example, the distance 220 between the diaphragm 180 and the surface 140 of the flow channel 130 is in the range 0 to 2 mm. By having the fluid chamber 165 define a small volume separating the sensor 150 from the flow channel 130, the risk of precipitation or collection or air or gases in the printer is reduced. Moreover, the stability of flow in the flow channel 130 of the sensor 100 and the sensor 100 measurement precision can be enhanced by forming the flow channel 130 as a straight channel having a surface 140 without any protrusions or obstacles.

The invention claimed is:

1. A printer comprising:
   a first port and a second port;
   a flow channel with a surface for conveying a fluid between the first port and the second port;

a sensor arranged in fluid communication with an opening in the surface of the flow channel;

a pressure box arranged in air communication with the sensor, wherein the sensor is a differential pressure sensor to identify the pressure difference between the air pressure in the pressure box and the fluid pressure in the flow channel.

2. The printer according to claim 1, wherein the sensor includes a diaphragm having an air side exposed to the air pressure in the pressure box and a fluid side exposed to the fluid pressure in the flow channel, wherein the distance between the diaphragm and the surface of the flow channel is in the range 0 to 2 mm.

3. The printer according to claim 2, wherein the diameter of the diaphragm exposed to the fluid pressure is in the range 2 to 10 mm.

4. The printer according to claim 1, wherein the opening in the surface of the flow channel is circular or rectangular.

5. The printer according to claim 1, wherein the opening in the surface of the flow channel is arranged in the center of the flow channel.

6. The printer according to claim 1, wherein the flow channel has a circular or rectangular cross-section having a diameter in the range 2 to 5 mm.

7. The printer according to claim 6, wherein the flow channel is a straight channel and wherein a surface of the flow channel guiding the fluid is even and without protrusions or obstacles.

8. The printer according to claim 1, wherein a length of the flow channel is in the range 20 to 40 mm.

9. The printer according to claim 1, wherein the sensor determines the pressure difference between the air pressure in the pressure box and the fluid pressure in the flow channel to determine a movement of the fluid in the range 40 $cm^3$/min to 200 $cm^3$/min.

10. The printer according to claim 1, wherein the fluid conveyed between the first port and the second port is an ink including pigments or heavy particles.

11. The printer according to claim 1, wherein the pressure box is hermetically sealed against the sensor.

12. The printer according to claim 11, wherein the pressure box has a port to pressurize the air inside the pressure box or to provide an outlet for conveying fluid.

13. A printer comprising:
a first port and a second port;
a straight flow channel having a surface for conveying a fluid between the first port and the second port without protrusions or obstacles;
a sensor arranged in fluid communication with an opening in the surface of the flow channel; and
a pressure box arranged in air communication with the sensor, wherein the sensor includes a diaphragm having an air side exposed to the air pressure in the pressure box and a fluid side exposed to the fluid pressure in the flow channel to identify the pressure difference between the air pressure in the pressure box and the fluid pressure in the flow channel to determine a movement or speed of the fluid.

14. A printer comprising:
a fluid conduit; and
a sensor device, wherein the sensor device comprises:
a first port and a second port both in fluid communication with the fluid conduit;
a flow channel including a surface for conveying a fluid between the first port and the second port;
a sensor arranged in fluid communication with an opening in the surface of the flow channel; and
a pressure box arranged in air communication with the sensor, wherein the sensor is a differential pressure sensor to identify the pressure difference between the air pressure in the pressure box and the fluid pressure in the flow channel, to determine a movement or speed of fluid in the fluid conduit.

15. The printer according to claim 14 further comprising an ink recirculation system including a recirculation conduit, wherein the sensor is arranged in the recirculation conduit and is to determine a movement or speed of fluid in the fluid conduit corresponding to an ink flow in the recirculation conduit.

* * * * *